US012427798B2

(12) United States Patent
Toda et al.

(10) Patent No.: US 12,427,798 B2
(45) Date of Patent: Sep. 30, 2025

(54) HEAT-SENSITIVE RECORDING COMPOSITION

(71) Applicant: NIPPON KAYAKU KABUSHIKI KAISHA, Tokyo (JP)

(72) Inventors: Yousuke Toda, Fukuyama (JP); Kousuke Shibagaki, Fukuyama (JP); Kyohei Miyanaga, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/712,296

(22) PCT Filed: Nov. 29, 2022

(86) PCT No.: PCT/JP2022/044057

§ 371 (c)(1),
(2) Date: Apr. 2, 2025

(87) PCT Pub. No.: WO2023/100900

PCT Pub. Date: Jun. 8, 2023

(65) Prior Publication Data

US 2025/0001788 A1 Jan. 2, 2025

(30) Foreign Application Priority Data

Nov. 30, 2021 (JP) ................................ 2021-193749

(51) Int. Cl.
*B41M 5/333* (2006.01)
*B41M 5/327* (2006.01)
*B41M 5/337* (2006.01)

(52) U.S. Cl.
CPC ........ *B41M 5/3275* (2013.01); *B41M 5/3333* (2013.01); *B41M 5/3375* (2013.01); *B41M 2205/04* (2013.01)

(58) Field of Classification Search
CPC ......................... B41M 5/3275; B41M 5/3333; B41M 5/3375; B41M 2205/04
See application file for complete search history.

(56) References Cited

U.S. PATENT DOCUMENTS

| | | | | |
|---|---|---|---|---|
| 3,539,375 | A | 11/1970 | Baum | |
| 6,624,117 | B1 | 9/2003 | Heneghan et al. | |
| 2008/0029024 | A1 | 2/2008 | Morita et al. | |
| 2015/0284321 | A1 | 10/2015 | Sakai et al. | |
| 2016/0082760 | A1 | 3/2016 | Takano et al. | |
| 2018/0345710 | A1 | 12/2018 | Miyanaga et al. | |
| 2020/0086669 | A1 | 3/2020 | Sakai et al. | |
| 2021/0031551 | A1 | 2/2021 | Boxhammer | |
| 2022/0184986 | A1 * | 6/2022 | Fisher | B41M 5/3333 |
| 2022/0410610 | A1 | 12/2022 | Kawasaki et al. | |
| 2024/0326501 | A1 | 10/2024 | Toda et al. | |

FOREIGN PATENT DOCUMENTS

| | | | |
|---|---|---|---|
| EP | 2957427 | A1 | 12/2015 |
| JP | 57-11088 | A | 1/1982 |
| JP | 2002-532441 | A | 10/2002 |
| JP | 2006-247611 | A | 9/2006 |
| JP | 4601174 | B2 | 12/2010 |
| JP | 2014-226848 | A | 12/2014 |
| JP | 2016-68418 | A | 5/2016 |
| JP | 2018-12269 | A | 1/2018 |
| JP | 2018-12270 | A | 1/2018 |
| JP | 6529197 | B2 | 6/2019 |
| JP | 2019-126933 | A | 8/2019 |
| JP | 2019-130879 | A | 8/2019 |
| JP | 2020-40287 | A | 3/2020 |
| WO | 2014/080615 | A1 | 5/2014 |
| WO | 2018/225663 | A1 | 12/2018 |
| WO | 2021/095751 | A1 | 5/2021 |
| WO | 2022/125104 | A1 | 6/2022 |

OTHER PUBLICATIONS

Ropaque TH-2000 technical data sheet acquired from "https://www.dow.com/en-us/document-viewer.html?docPath=/content/dam/dcc/documents/883/883-00961-01-ropaque-th-2000-hollow-sphere-pigment.pdf" (Year: 2022).*
International Preliminary Report on Patentability issued Jun. 13, 2024 in corresponding PCT application No. PCT/JP2022/044057.
International Preliminary Report on Patentability issued Jun. 13, 2024 in co-pending PCT application No. PCT/JP2022/044059.
International Search Report mailed Jan. 31, 2023 in corresponding PCT application No. PCT/JP2022/044057.

(Continued)

*Primary Examiner* — Gerard Higgins

(74) *Attorney, Agent, or Firm* — Nields, Lemack & Frame, LLC

(57) ABSTRACT

The present invention provides a heat-sensitive recording material which has improved thermal responsiveness and improved stability of the print part and the background in comparison to conventional heat-sensitive recording materials that contain a non-phenolic compound as a color developer. The present invention provides a heat-sensitive recording composition which contains a color former, a color developer and a stabilizer, wherein: N-[2-(3-phenylureido)phenyl] benzenesulfonamide or N-(p-toluenesulfonyl)-N'-(3-p-toluenesulfonyloxyphenyl) urea is contained as the color developer, and 1,3-diphenyl urea is contained as the stabilizer.

9 Claims, No Drawings

(56) References Cited

OTHER PUBLICATIONS

International Search Report mailed Jan. 31, 2023 in co-pending PCT application No. PCT/JP2022/044059.
Office Action mailed Aug. 13, 2024 in co-pending U.S. Appl. No. 18/712,298.
European communication dated Nov. 18, 2024 in co-pending European patent application No. 22901332.1.
Final Rejection mailed Nov. 13, 2024 in co-pending U.S. Appl. No. 18/712,298.
European communication dated Nov. 18, 2024 in co-pending European patent application No. 22901334.7.

* cited by examiner

HEAT-SENSITIVE RECORDING COMPOSITION

TECHNICAL FIELD

The present invention relates to a heat-sensitive recording composition comprising a specific color-developing compound and a specific stabilizer (preservability improver), and a heat-sensitive recording material composing a heat-sensitive recording layer made of the composition on a support.

BACKGROUND ART

A heat-sensitive recording material is generally obtained by separately dispersing a color-forming compound and a color-developing compound in particulate form in a medium, then mixing the resulting dispersions, adding an additive such as a binder, a sensitizer, a filler, or a lubricant to the resulting mixture to prepare a coating liquid, and applying the coating liquid to paper, a film, synthetic paper, or the like. When the obtained heat-sensitive recording material is heated using a thermal printer equipped with a thermal head, etc., one or both of the color-forming compound and the color-developing compound are melted, and they come into contact with each other, which brings a chemical reaction to produce printed portions (colored portions).

Compared to other recording methods, the heat-sensitive recording method has the advantages of (1) no noise during recording, (2) no need for developing and fixing an image, (3) maintenance-free, and (4) relatively inexpensive machines. Therefore, the heat-sensitive recording method has been widely used in the fields of a facsimile, output of a computer, a printer of a calculator or the like, a recorder of a medical instrument, an automated ticket vending machine, a heat-sensitive recording label, and the like.

In recent years, applications of heat-sensitive recording materials have been increasing in the fields of labels, boarding tickets, coupon tickets and the like which are associated with POS systems in retail stores, supermarkets and the like, and automated systems in transportation. In these applications, there are increasing demands for resistance of printed portions to water, hot water, heat, oil, plasticizers, alcohol, etc., as well as storage stability of unprinted portions (background) before color formation. Furthermore, the demand for high-speed recording has been increasing, and it is strongly desired to develop a heat-sensitive recording material that can adequately respond to these demands and has excellent thermal responsiveness. To enhance thermal responsiveness, generally, a color-developing compound with a low melting point and low heat of fusion is required. However, when such a color-developing compound is used, unprinted portions (i.e., a background) of a heat-sensitive recording material are prone to darken, which is a phenomenon called background fogging, during production, use, or storage. Therefore, there is a need for a heat-sensitive recording material with enhanced thermal responsiveness as well as improved stability of background.

Color-developing compounds with a phenolic hydroxyl group generally have high color-developing ability. Among the compounds, bisphenol compounds have been reported many times because of their high color-forming density, and 2,2-bis(4-hydroxyphenylpropane) (bisphenol A) (Patent Literature 1), 4,4'-dihydroxydiphenylsulfone (bisphenol S) (Patent Literature 2), and the like have been proposed. However, these compounds have the disadvantages of poor thermal responsiveness due to their high melting points, and poor resistance of printed portions to water. Furthermore, phenolic compounds such as bisphenol A are considered problematic in terms of the endocrine issue. Therefore, there is a demand for a non-phenolic color-developing compound with no phenol structure.

In response to such a demand. N-[2-(3-phenylureido) phenyl]benzenesulfonamide (Patent Literature 3) and N-(p-toluenesulfonyl)-N'-(3-p-toluenesulfonyloxyphenyl) urea (Patent Literature 4) have been proposed as a non-phenolic color-developing compound.

Heat-sensitive recording materials containing N-[2-(3-phenylureido)phenyl]benzenesulfonamide as a color-developing compound are excellent in heat resistance, and less likely to cause background fogging and thus very good in stability of the background. However, a heat-sensitive recording material containing this compound are not necessarily satisfactory in terms of thermal responsiveness and storage stability of printed portions; particularly, improved resistance of printed portions to oil and plasticizers is desired.

The heat-sensitive recording material containing N-(p-toluenesulfonyl)-N'-(3-p-toluenesulfonyloxyphenyl) urea is not necessarily sufficient in terms of hot water resistance of printed portions, and it is prone to cause background fogging and has thus insufficient stability of a background. Therefore, further improvement in these performances is desired.

CITATION LIST

Patent Literature

PATENT LITERATURE 1: U.S. Pat. No. 3,539,375
PATENT LITERATURE 2: JP-A-57-11088
PATENT LITERATURE 3: WO 2014/080615 A
PATENT LITERATURE 4: JP-B-4601174

SUMMARY OF INVENTION

Technical Problem

An object of the present invention is to resolve problems of the conventional heat-sensitive recording materials containing a non-phenolic compound as a color developer, more specifically, to provide a heat-sensitive recording material containing a non-phenolic compound as a color developer, wherein the material exhibits improved thermal responsiveness and improved stability of printed portions and a background.

Solution to Problem

As a result of intensive studies, the present inventors have newly found that the above-described problems are solved by a heat-sensitive recording composition comprising a color former and a specific non-phenolic compound as a papecolor developer, wherein the composition further comprises 1,3-diphenylurea as a stabilizer (preservability improver), and thus completed the present invention.

That is, the present invention relates to:

[1] a heat-sensitive recording composition comprising a color former, a color developer, and a stabilizer, wherein the composition comprises N-[2-(3-phenylureido)phenyl]benzenesulfonamide or N-(p-toluenesulfonyl)-N'-(3-p-toluenesulfonyloxyphenyl) urea as the color developer, and 1,3-diphenylurea as the stabilizer;

[2] the heat-sensitive recording composition according to [1], wherein the composition comprises one or more compounds selected from the group consisting of triarylmethane compounds, fluoran compounds, azaphthalide compounds, and fluorene compounds as the color former;

[3] the heat-sensitive recording composition according to [2], wherein the composition comprises, as the color former, one or more fluoran compounds selected from the group consisting of 3-diethylamino-6-methyl-7-anilinofluoran. 3-(N-ethyl-p-toluidino)-6-methyl-7-anilinofluoran, 3-(N-ethyl-N-isoamylamino)-6-methyl-7-anilinofluoran, 3-diethylamino-6-methyl-7-(o,p-dimethylanilino) fluoran, 3-pyrrolidino-6-methyl-7-anilinofluoran. 3-(cyclohexyl-N-methylamino)-6-methyl-7-anilinofluoran, 3-diethylamino-7-(m-trifluoromethylanilino) fluoran, 3-N-n-dibutylamino-6-methyl-7-anilinofluoran, 3-diethylamino-6-methyl-7-(m-methylanilino) fluoran, 3-N-n-dibutylamino-7-(o-chloroanilino) fluoran, 3-(N-ethyl-N-tetrahydrofurfurylamino)-6-methyl-7-anilinofluoran, 3-(N-ethyl-N-ethoxypropylamino)-6-methyl-7-anilinofluoran, 3-(N-ethyl-N-isobutylamino)-6-methyl-7-anilinofluoran, and 3-dipentylamino-6-methyl-7-anilinofluoran;

[4] the heat-sensitive recording composition according to any one of [1] to [3], wherein a mass ratio of a content of the color developer to a content of the color former is 1:1 to 5:1 (color developer:color former);

[5] the heat-sensitive recording composition according to any one of [1] to [4], wherein a mass ratio of a content of the color developer to a content of the 1,3-diphenylurea is 1:1 to 3:1 (color developer: 1,3-diphenylurea);

[6] a heat-sensitive recording material comprising a support and a heat-sensitive recording layer on the support, wherein the heat-sensitive recording layer comprises or made of the heat-sensitive recording composition according to any one of [1] to [5];

[7] the heat-sensitive recording material according to [6], wherein the support is wood free paper, synthetic paper, or a plastic film;

[8] the heat-sensitive recording material according to [6] or [7], wherein the material comprises the heat-sensitive recording layer at a mass per unit area of 1 to 20 $g/m^2$;

[9] the heat-sensitive recording material according to any one of [6] to [8], wherein the material further comprises an undercoat layer comprising an organic pigment and/or an inorganic pigment between the support and the heat-sensitive recording laver;

[10] the heat-sensitive recording material according to [9], wherein the inorganic pigment is an oil-absorbing inorganic pigment with the oil absorption of 70 to 150 ml/100 g;

[11] the heat-sensitive recording material according to [10], wherein the inorganic pigment is calcined kaolin; and

[12] the heat-sensitive recording material according to [9], wherein the organic pigment is plastic hollow particles with a value of 50 to 99 as calculated by the formula: (average inner diameter/average outer diameter)×100.

Advantageous Effects of Invention

A heat-sensitive recording material according to the present invention has improved properties in terms of thermal responsiveness, and oil resistance and plasticizer resistance of printed portions, compared with conventional heat-sensitive recording materials containing N-[2-(3-phenylureido) phenyl]benzenesulfonamide as a color-developing compound.

A heat-sensitive recording material according to the present invention also has improved properties in terms of thermal responsiveness, stability of a background, and hot water resistance of printed portions, compared with conventional heat-sensitive recording materials containing N-(p-toluenesulfonyl)-N'-(3-p-toluenesulfonyloxyphenyl) urea.

DESCRIPTION OF EMBODIMENTS

Hereinafter, the present invention will be described in detail with reference to embodiments, however, the present invention is not limited to the embodiments.

Heat-Sensitive Recording Composition

A heat-sensitive recording composition of the present invention comprises a color former, a color developer, and a stabilizer, and is characterized by comprising a specific color-developing compound as the color developer and a specific stabilizing compound as the stabilizer.

In the heat-sensitive recording composition of the present invention, the color former is not particularly limited, and color-forming compounds ordinarily used in pressure-sensitive recording paper or heat-sensitive recording paper may be used.

Specific examples of the color-forming compound include fluoran compounds, triarylmethane compounds, spiro compounds, diphenylmethane compounds, thiazine compounds, lactam compounds, fluorene compounds, and vinyl phthalide compounds, and fluoran compounds. Triarylmethane compounds, azaphthalide compounds, and fluorene compounds are preferable, and fluoran compounds are more preferable. These color-forming compounds can be used singly or in combination.

The fluoran compounds are compounds having a fluoran skeleton. The fluoran compounds are not particularly limited and may be fluoran compounds ordinarily used as a color former in heat-sensitive recording paper.

Specific examples of the fluoran compound include 3-diethylamino-6-methyl-7-anilinofluoran, 3-dibutylamino-6-methyl-7-anilinofluoran. 3-(N-methyl-N-cyclohexylamino)-6-methyl-7-anilinofluoran, 3-(N-ethyl-N-isopentylamino)-6-methyl-7-anilinofluoran. 3-(N-ethyl-N-isobutylamino)-6-methyl-7-anilinofluoran, 3-[N-ethyl-N-(3-ethoxypropyl) amino]-6-methyl-7-anilinofluoran. 3-(N-ethyl-N-hexylamino)-6-methyl-7-anilinofluoran. 3-dipentylamino-6-methyl-7-anilinofluoran. 3-(N-methyl-N-propylamino)-6-methyl-7-anilinofluoran. 3-(N-ethyl-N-tetrahydrofurylamino)-6-methyl-7-anilinofluoran, 3-diethylamino-6-methyl-7-(p-chloroanilino) fluoran, 3-diethylamino-6-methyl-7-(p-fluoroanilino) fluoran, 3-[N-ethyl-N-(p-tolyl)amino]-6-methyl-7-anilinofluoran, 3-diethylamino-6-methyl-7-(p-toluidino) fluoran. 3-diethylamino-7-(o-chloroanilino) fluoran. 3-dibutylamino-7-(o-chloroanilino) fluoran, 3-diethylamino-7-(o-fluoroanilino) fluoran, 3-dibutylamino-7-(o-fluoroanilino) fluoran, 3-diethylamino-7-(3,4-dichloroanilino) fluoran, 3-pyrrolidino-6-methyl-7-anilinofluoran, 3-diethylamino-6-chloro-7-ethoxyethylaminofluoran. 3-diethylamino-6-chloro-7-anilinofluoran, 3-diethylamino-7-chlorofluoran, 3-diethylamino-7-methylfluoran, 3-diethylamino-7-octylfluoran, 3-[N-ethyl-N-(p-tolyl)amino]-6-methyl-7-phenethylfluoran, 2-methyl-6-(N-p-tolyl-N-ethylamino) fluoran (RED 520), 9-(N-ethyl-N-isopentylamino)spiro[benzo[a]

xanthene-12,3'-phthalide] (RED 500), 2''-anilino-6-(N-ethyl-N-isopentylamino)-3-methylspiro[phthalide-3,9'-xanthene] (S-205), 2'-anilino-6-(N,N-dipentane-1-ylamino)-3'-methyl-3H-spiro[isobenzofuran-1,9'-xanthene]-3-one (Black 305). 2'-anilino-6'-(dibutylamino)-3'-methylspiro [phthalide-3,9'-xanthene] (Black 400). 2'-anilino-6''-[N-ethyl-N-(4-tolyl)amino]-3-methyl-3H-spiro[isobenzofuran-1,9'-xanthene]-3-one (ETAC), 6-(diethylamino)-2-[(3-trifluoromethyl)anilino]xanthene-9-spiro-3'-phthalide (Black 100), 1-ethyl-8-[N-ethyl-N-(4-methylphenyl) amino]-2,2,4-trimethyl-1,2-dihydrospiro[11H-chromeno[2, 3-g]quinoline-11,3'-phthalide] (H-1046), 3-dibutylamino-6-methyl-7-bromofluoran, and 3-[4-(diethylamino)phenyl]-3-(1-ethyl-2-methyl-1H-indole-3-yl)-1 (3H)-isobenzofuranone (Blue 502). 3-dibutylamino-6-methyl-7-anilinofluoran is preferable.

The triarylmethane compounds are compounds having a triarylmethane skeleton. The triarylmethane compounds are not particularly limited and may be triarylmethane compounds ordinarily used as a color former in heat-sensitive recording paper.

Specific examples of the triarylmethane compound include 3,3-bis(p-dimethylaminophenyl)-6-dimethylaminophthalide (another name: crystal violet lactone or CVL), 3,3-bis(p-dimethylaminophenyl) phthalide. 3-(p-dimethylaminophenyl)-3-(1,2-dimethylaminoindole-3-yl) phthalide, 3-(p-dimethylaminophenyl)-3-(2-methylindole-3-yl) phthalide, 3-(p-dimethylaminophenyl)-3-(2-phenylindole-3-yl) phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-(2-phenylindole-3-yl)-5-dimethylaminophthalide, 3-p-dimethylaminophenyl-3-(1-methylpyrrole-2-yl)-6-dimethylaminophthalide, 3-(4-diethylamino-2-methylphenyl)-3-(1-ethyl-2-methylindole-3-yl)-4-azaphthalide (Blue 200), 3-[4-(diethylamino)-2-hexyloxyphenyl]-3-(1-ethyl-2-methylindole-3-yl)-4-azaphthalide (Blue 203), 3-(4-diethylamino-2-methylphenyl)-3-(1-ethyl 2-methyl-1H-indole-3-yl)-4-azaphthalide (Blue 220), and 7-(4-diethylamino-2-ethoxyphenyl)-7-(1-ethyl-2-methyl-1H-indole-3-yl)furo[3, 4-b]pyridin-5(7H)-one (Blue 63).

The spiro compounds are compounds having a spiro skeleton. The spiro compounds are not particularly limited and may be spiro compounds ordinarily used as a color former in heat-sensitive recording paper.

Specific examples of the spiro compound include 3-methylspirodinaphthopyran, 3-ethylspirodinaphthopyran, 3,3'-dichlorospirodinaphthopyran, 3-benzylspirodinaphthopyran, 3-propylspirobenzopyran, 3-methylnaphtho-(3-methoxybenzo)spiropyran, and 1,3,3-trimethyl-6-nitro-8'-methoxyspiro(indoline-2,2'-benzopyran).

The diphenylmethane compounds are compounds having a diphenylmethane skeleton. The diphenylmethane compounds are not particularly limited and may be diphenylmethane compounds ordinarily used as a color former in heat-sensitive recording paper.

Specific examples of the diphenylmethane compound include N-halophenyl-leucoauramine, 4,4-bis-dimethylaminophenylbenzhydrylbenzyl ether, and N-2,4,5-trichlorophenylleucoauramine.

The thiazine compounds are compounds having a thiazine skeleton. The thiazine compounds are not particularly limited and may be thiazine compounds ordinarily used as a color former in heat-sensitive recording paper.

Specific examples of the thiazine compound include benzoyl leuco methylene blue, and p-nitrobenzoyl leuco methylene blue.

The lactam compounds are compounds having a lactam skeleton. The lactam compounds are not particularly limited and may be lactam compounds ordinarily used as a color former in heat-sensitive recording paper.

Specific examples of the lactam compound include rhodamine B anilinolactam, and rhodamine B-p-chloroanilinolactam.

The fluorene compounds are compounds having a fluorene skeleton. The fluorene compounds are not particularly limited and may be fluorene compounds ordinarily used as a color former in heat-sensitive recording paper.

Specific examples of the fluorene compound include 3,6-bis(dimethylamino) fluorenespiro(9,3')-6'-dimethylaminophthalide, 3,6-bis(dimethylamino) fluorenespiro(9,3'')-6'-pyrrolidinophthalide, and 3-dimethylamino-6-diethylaminofluorenespiro(9.3)-6'-pyrrolidinophthalide.

The vinyl phthalide compounds are compound having a vinyl phthalide skeleton. The vinyl phthalide compounds are not particularly limited and may be vinyl phthalide compounds ordinarily used as a color former in heat-sensitive recording paper.

Specific examples of the vinyl phthalide compound include 3-[2,2-bis(4-diethylaminophenyl) vinyl]-6-dimethylaminophthalide (H-3035), and 3,3-bis[2-(4-dimethylaminophenyl)-2-(4-methoxyphenyl) vinyl]-4,5,6,7-tetrachlorophthalide (NIR Black 78).

A heat-sensitive recording composition of the present invention comprises N-[2-(3-phenylureido)phenyl]benzenesulfonamide or N-(p-toluenesulfonyl)-N'-(3-p-toluenesulfonyloxyphenyl) urea as the color developer, and 1,3-diphenylurea as the stabilizer (preservability improver).

Conventional heat-sensitive recording materials containing these non-phenolic color-developing compounds do not necessarily exhibit sufficient properties in terms of thermal responsiveness, oil resistance and plasticizer resistance or thermal responsiveness of printed portions, stability of a background, and hot water resistance of printed portions. In contrast, a heat-sensitive recording composition according to the present invention, which comprises such a non-phenolic color-developing compound and 1,3-diphenylurea as the stabilizer (preservability improver), can provide a heat-sensitive recording material with improved thermal responsiveness and improved stability of printed portions and a background, as compared with these conventional heat-sensitive recording materials.

A heat-sensitive recording composition of the present invention may comprise a color-developing compound other than N-[2-(3-phenylureido)phenyl]benzenesulfonamide and N-(p-toluenesulfonyl)-N'-(3-p-toluenesulfonyloxyphenyl) urea, unless an effect of the present invention is impaired. The other color-developing compounds are not particularly limited, and examples thereof include benzotriazole derivatives (compounds having a benzotriazole skeleton, note that hereinafter, a term “XXX derivatives” means compounds that has an XXX skeleton and may be different in other structures), saccharin derivatives, sulfonamide derivatives, malonamide derivatives, thiourea derivatives, sulfonylurea derivatives, and aromatic carboxylic acid derivatives.

Specific examples of the benzotriazole derivatives include benzotriazole, 5-methyl-1H-benzotriazole, 4-methyl-1H-benzotriazole, phenyl-6 benzotriazole, phenyl-5 benzotriazole, chloro-5 benzotriazole, chloro-5 methylbenzotriazole, chloro-5 isopropyl-7 methyl-4 benzotriazole, and bromo-5 benzotriazole.

Specific examples of the saccharin derivatives include saccharin, 1-bromosaccharin, 1-nitrosaccharin, and 1-aminosaccharin.

Specific examples of the sulfonamide derivatives include metanilanilide, N-phenyl-4-aminobenzenesulfonamide, neo-uliron, N-phenyl-3-nitrobenzenesulfonamide, N-(4-methyl-2-nitrophenyl)benzenesulfonamide, N-(2-methoxyphenyl)-p-toluenesulfonamide, N-(4-methoxyphenyl)-p-toluenesulfonamide, N-(2-chlorophenyl)-p-toluenesulfonamide, N-(4-methylphenyl)-4-methylbenzenesulfonamide, N-(2-methylphenyl)-p-toluenesulfonamide, N-phenylbenzenesulfonamide, 4-bromo-4'-methylbenzenesulfonanilide, N-(4-bromophenyl)benzenesulfonamide, N-(3-nitrophenyl)benzenesulfonamide, N-(4-nitrophenyl)-4-methylbenzenesulfonamide, N-(4-methylphenyl)benzenesulfonamide, N-phenyl-p-toluenesulfonamide, and N-phenylbenzenesulfonamide.

Specific examples of the malonamide derivatives include N,N'-bis(2-hydroxy-5-phenyl)phenyl-malonamide, N,N'-diphenylmalonamide, N,N'-bis(2,4,6-tribromophenyl) malonamide, N,N'-bis(2-aminophenyl) malonamide, N,N'-bis(m-trifluoromethylphenyl) malonamide, N,N'-bis(m-trifluoromethylphenyl)α,α-dichloromalonamide, and diethylmalondianilide.

Specific examples of the thiourea derivatives include 1,3-bis(4-methylphenyl)thiourea, 1,3-bisphenylthiourea, 1,3-bis(4-chlorophenyl)thiourea, 1,3-bis(4-methoxyphenyl) thiourea, N,N'-bis(3-chlorophenyl)thiourea, 1,3-bis(3-methoxyphenyl)thiourea, 1,3-bis(3-methylphenyl)thiourea, 1,3-bis(4-benzylphenyl)thiourea, 1,3-bis(4-bromophenyl) thiourea, 1-phenyl-3-butylthiourea, and 1-phenyl-3-ethylthiourea.

Specific examples of the sulfonylurea derivatives include N-(p-toluenesulfonyl)-N'-(3-n-butylaminosulfonylphenyl) urea, N-(p-toluenesulfonyl)-N'-(4-trimethylacetophenyl) urea, N-(benzenesulfonyl)-N'-(3-p-toluenesulfonyloxyphenyl) urea, N-(p-toluenesulfonyl)-N'-(3-p-toluenesulfonylphenyl) urea, N-(p-toluenesulfonyl)-N'-(3-phenylsulfonyloxyphenyl) urea, [3-(3-phenylureido)phenyl]-4-methylbenzenesulfonate, tolbutamide, and chlorpropamide.

Specific examples of the aromatic carboxylic acid derivatives include benzyl p-hydroxybenzoate, ethyl p-hydroxy benzoate, dibenzyl 4-hydroxyphthalate, dimethyl 4-hydroxyphthalate, ethyl 5-hydroxyisophthalate, 3,5-di-t-butylsalicylic acid, 3,5-di-α-methylbenzylsalicylic acid, and aromatic carboxylic acids and polyvalent metal salts thereof.

In a heat-sensitive recording composition of the present invention, a mass ratio of the content of a color developer(s) to the content of a color former(s) (color developer(s):color former(s)) is usually 1:10 to 10:1, preferably 1:5 to 7:1, more preferably 1:1 to 5:1, still more preferably 1.5:1 to 4:1, and particularly preferably 2:1 to 3:1, from the viewpoint of thermal responsiveness and storage stability of a background.

N-[2-(3-phenylureido)phenyl]benzenesulfonamide and N-(p-toluenesulfonyl)-N'-(3-p-toluenesulfonyloxyphenyl) urea may be used in combination as the color developers, unless an effect of the present invention is impaired.

A mass ratio of the content of a color developer(s) to the content of 1,3-diphenylurea in a heat-sensitive recording composition of the present invention (color developer(s): 1,3-diphenylurea) is usually 3:4 to 5:1, preferably 1:1 to 4:1, more preferably 1:1 to 3:1, and particularly preferably 6:5 to 2:1. A content ratio between the color developer and 1,3-diphenylurea within the above range can bring about excellent properties in terms of printing density (thermal responsiveness) and resistance of printed portions to a plasticizer, an oil component, moisture, and the like.

A heat-sensitive recording composition of the present invention may comprise a sensitizer, a stabilizer other than 1,3-diphenylurea, a binder, a filler, and another additive as necessary. In the case of a heat-sensitive recording layer with a multilayer structure, these optional components may be contained in a layer other than the layer containing a heat-sensitive recording composition of the present invention. In the case of a heat-sensitive recording material in which an undercoat layer or an overcoat layer is provided under and/or over a heat-sensitive recording layer, the optional components may be contained in these layers.

Specific examples of the sensitizer (thermally fusible compound) include waxes such as animal and plant waxes and synthetic waves, higher fatty acids, higher fatty acid amides, higher fatty acid anilides, naphthalene derivatives, aromatic ethers, aromatic carboxylic acid derivatives, aromatic sulfonic acid ester derivatives, carbonic acid or oxalic acid diester derivatives, biphenyl derivatives, terphenyl derivatives, sulfone derivatives, aromatic ketone derivatives, and aromatic hydrocarbon compounds.

Specific examples of the waxes include Japanese wax, carnauba wax, shellac, paraffin, montan wax, oxidized paraffin, polyethylene wax, and oxidized polyethylene, and specific examples of the higher fatty acids include stearic acid and behenic acid. Specific examples of the higher fatty acid amides include stearic acid amide, oleic acid amide, N-methylstearic acid amide, erucic acid amide, methylol behenic acid amide, methylene bisstearic acid amide, and ethylene bisstearic acid amide, specific examples of the higher fatty acid anilides include stearic acid anilide and linoleic acid anilide, and specific examples of the naphthalene derivatives include 1-benzyloxynaphthalene, 2-benzyloxynaphthalene, 1-hydroxynaphthoic acid phenyl ester, and 2,6-diisopropylnaphthalene. Specific examples of the aromatic ethers include 1,2-diphenoxyethane, 1,4-diphenoxybutane, 1,2-bis(3-methylphenoxy) ethane, 1,2-bis(4-methylphenoxy) ethane, 1,2-bis(4-methoxyphenoxy) ethane, 1,2-bis(3,4-dimethylphenyl) ethane, 1-phenoxy-2-(4-chlorophenoxy) ethane, 1-phenoxy-2-(4-methoxyphenoxy) ethane, 1,2-diphenoxymethylbenzene, and diphenyl glycol, and specific examples of the aromatic carboxylic acid derivatives include p-hydroxybenzoic acid benzyl ester, p-benzyloxybenzoic acid benzyl ester, and terephthalic acid dibenzyl ester. Specific examples of the aromatic sulfonic acid ester derivatives include p-toluenesulfonic acid phenyl ester, phenyl mesitylene sulfonate, 4-methylphenyl mesitylene sulfonate, and 4-tolyl mesitylene sulfonate, specific examples of the carbonic acid or oxalic acid diester derivatives include carbonic acid diphenyl, oxalic acid dibenzyl ester, oxalic acid di(4-chlorobenzyl) ester, and oxalic acid di(4-methylbenzyl) ester, and specific examples of the biphenyl derivatives include p-benzylbiphenyl and p-allyloxybiphenyl. Specific examples of the terphenyl derivatives include m-terphenyl, and specific examples of the sulfone derivatives include p-toluenesulfonamide, benzenesulfonanilide, p-toluenesulfonanilide, and diphenylsulfone. Specific examples of the aromatic ketone derivatives include 4,4'-dimethylbenzophenone and dibenzoylmethane, and specific examples of the aromatic hydrocarbon compounds include p-acetotoluidine.

Specific examples of the stabilizer other than 1,3-diphenylurea include hindered phenol compounds such as 2,2'-methylenebis(4-methyl-6-t-butylphenol), 2,2'-methylenebis (4-ethyl-6-t-butylphenol), 2,2"-ethylidenebis(4,6-di-t-butylphenol), 4,4-thiobis(2-methyl-6-t-butylphenol), 4,4"- butylidenebis(6-t-butyl-m-cresol), 1-[α-methyl-α-(4'-hydroxyphenyl)ethyl]-4-[α',α'-bis(4'-hydroxyphenyl)ethyl] benzene, 1,1,3-tris(2-methyl-4-hydroxy-5-cyclohexylphenyl)butane, 1,1,3-tris(2-methyl-4-hydroxy-5-t-butylphenyl) butane, tris(2,6-dimethyl-4-tertiary butyl-3-hydroxy benzyl) isocyanurate, 4,4'-thiobis(3-methylphenol), 4,4-dihydroxy-3,3',5,5"-tetrabromodiphenylsulfone, 4,4'-dihydroxy-3,3',5,5'-tetramethyldiphenylsulfone, 2,2-bis(4-hydroxy-3,5-dibromophenyl)propane, 2,2-bis(4-hydroxy-3,5-dichlorophenyl)propane, and 2,2-bis(4-hydroxy-3,5-dimethylphenyl) propane, epoxy compounds such as 1,4-diglycidyloxybenzene, 4,4"-diglycidyloxy diphenylsulfone, 4-benzyloxy-4'-(2-methylglycidyloxy)diphenylsulfone, diglycidyl terephthalate, cresol novolac type epoxy resins, phenol novolac type epoxy resins, and bisphenol A type epoxy resins, N,N'-di-2-naphthyl-p-phenylenediamine, sodium or polyvalent metal salts of 2,2'-methylenebis(4,6-di-t-butylphenyl)phosphate, bis(4-ethyleneiminocarbonylaminophenyl) methane, urea urethane compounds (color-developing compound UU manufactured by Chemipro Kasei Kaisha, Ltd., and the like), and diphenylsulfone crosslinked compounds represented by Formula (1) described below, and mixtures thereof.

[Chem. 1]

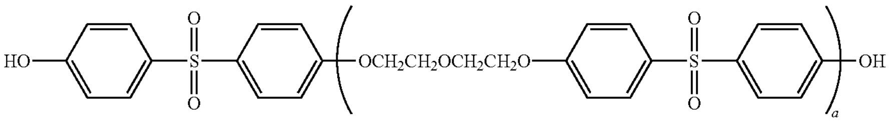

(1)

In Formula (1), a is an integer of 0 to 6.

Specific examples of the binder include:

cellulose derivatives such as methyl cellulose, methoxy cellulose, hydroxyethyl cellulose, carboxymethyl cellulose, sodium carboxymethyl cellulose, and cellulose; polyvinyl alcohols having various degrees of saponification and polymerization such as polyvinyl alcohol (PVA), carboxy-modified polyvinyl alcohol, sulfonic acid-modified polyvinyl alcohol, silyl-modified polyvinyl alcohol, diacetone-modified polyvinyl alcohol, and acetoacetyl-modified polyvinyl alcohol; polyvinylpyrrolidone, polyacrylamide, sodium polyacrylate, starch and its derivatives (such as oxidized starch); sulfosuccinic acid esters such as dioctyl sodium sulfosuccinate; aqueous solutions and emulsions of water-soluble polymers such as sodium dodecylbenzenesulfonate, a sodium salt of lauryl alcohol sulfuric acid ester, fatty acid salts, casein, gelatin, water-soluble isoprene rubber, alkali salts of styrene/maleic anhydride copolymers, and alkali salts of iso- (or diiso-) butylene/maleic anhydride copolymers; and emulsions of hydrophobic polymers such as (meth)acrylic acid ester copolymers, styrene/(meth)acrylic acid ester copolymers, polyurethane, polyester-based polyurethane, polyether-based polyurethane, polyvinyl acetate, ethylene/vinyl acetate copolymers, starch-vinyl acetate graft copolymers, polyvinyl chloride, vinyl chloride/vinyl acetate copolymers, polyvinylidene chloride, polystyrene, styrene/butadiene (SB) copolymers, carboxylated styrene/butadiene (SB) copolymers, styrene/butadiene/acrylic acid-based copolymers, acrylonitrile/butadiene (NB) copolymers, carboxylated acrylonitrile/butadiene (NB) copolymers, and composite particles of colloidal silica and (meth)acrylic resin.

Specific examples of the filler include:

inorganic pigments such as calcium carbonate, magnesium carbonate, magnesium oxide, silica white carbon, kaolin, calcined kaolin, lithopone, talc, clay, magnesium hydroxide, aluminum hydroxide, titanium oxide, zinc oxide, aluminum oxide, barium sulfate, diatomaceous earth, white earth oxide, bentonite, synthetic aluminum silicate, surface-treated calcium carbonate and silica; and organic pigments such as urea-formalin resins, styrene-methacrylic acid copolymer resins, a polystyrene resin, and raw starch particles.

Examples of another additive include higher fatty acid metal salts such as zinc stearate and calcium stearate that are used in combination for the purpose of, for example, preventing wear of a thermal head and preventing sticking, ultraviolet absorbers such as phenol derivatives, benzophenone-based compounds, and benzotriazole-based compounds that are used in combination for the purpose of imparting an antioxidant or antiaging effect, and various crosslinking agents, surfactants, and antifoaming agents. These antioxidants and ultraviolet absorbers may be microencapsulated as necessary.

The contents of optional components in the heat-sensitive recording composition are not particularly limited unless an effect of the present invention is impaired, and their adequate contents in the heat-sensitive recording composition are as follows. The adequate content of the sensitizer is 80 mass % or less, the adequate content of stabilizers is such that the total content of 1,3-diphenylurea and another stabilizer is 30 mass % or less, the adequate content of the binder is 90 mass % or less, the adequate content of the filler is 80 mass % or less, and the adequate content of other additives such as a lubricant, a surfactant, an antifoaming agent, and an ultraviolet absorber is, for example, 30 mass % or less (each amount shown by mass % is a value in terms of a solid content of each component).

Heat-Sensitive Recording Material

A heat-sensitive recording material of the present invention comprises a support and a heat-sensitive recording layer comprising the above-described heat-sensitive recording composition on the support.

The support is not particularly limited in terms of its and shape, and examples of the support include paper material (for example, plain paper, wood free paper, coated paper, synthetic paper, laminated paper, and recycled paper such as recycled pulp), films made of a synthetic resin such as non-foamed or foamed plastic, and nonwoven fabrics.

A method of providing a heat-sensitive recording layer on the support is also not particularly limited, and the heat-sensitive recording layer can be produced, for example, by providing water as a dispersion medium, separately grinding and dispersing a color-forming compound, a color-developing compound, and a stabilizer described above with a dispersing machine, such as a ball mill, an attritor, a sand mill, or a high pressure jet mill, to obtain dispersions, mixing the obtained dispersions and, as necessary, another optional component to obtain a dispersion of a heat-sensitive recording composition, and applying and drying the dispersion on a support. The applied amount of the dispersion of the heat-sensitive recording composition is not particularly limited, but is preferably such that a mass per unit area of the heat-sensitive recording layer after drying is 1 to 20 $g/m^2$.

An undercoat layer may be provided between a support and a heat-sensitive recording layer as necessary, or an overcoat layer may be provided on a heat-sensitive recording layer. The undercoat layer or the overcoat layer is to be formed, for example, by appropriately selecting according to the purpose constituent components, such as a binder and another additive, other than a color developer and a color former in a heat-sensitive recording composition described above, crushing and dispersing the constituent components to prepare a dispersion in the same manner as in the method of preparing a dispersion of the heat-sensitive recording composition, and applying and drying the dispersion on a support or a predetermined layer. The applied amount of a dispersion for the undercoat layer or the overcoat layer is not particularly limited, but it is preferable to apply the dispersion in an amount such that a mass per unit area of the undercoat layer or the overcoat layer after drying is 0.1 to 10 $g/m^2$.

The undercoat layer preferably comprises at least one of organic pigments and inorganic pigments in order to further improve the recording sensitivity and the recording traveling property.

As the inorganic pigment used for the undercoat layer, an oil-absorbing inorganic pigment is preferable from the viewpoint of suppressing adhesion of scum to a thermal head and suppressing sticking. The oil-absorptive inorganic pigment is not particularly limited, but an oil-absorbing inorganic pigment with the oil absorption of 70 ml/100 g or more is preferable, and an oil-absorbing inorganic pigment with the oil absorption of 70 to 150 ml/100 g is more preferable. The oil absorption here can be determined in accordance with the method of JIS K 5101.

As the oil-absorptive inorganic pigment, various pigments can be used, and examples thereof include calcined kaolin, aluminum oxide, magnesium carbonate, amorphous silica, light calcium carbonate, and talc. The average particle diameter of the primary particles of these oil-absorptive inorganic pigments is preferably 0.01 to 5 μm, and more preferably 0.02 to 3 μm. The content of the oil-absorptive inorganic pigment is not particularly limited and can be selected from a wide range, but is generally preferably 2 to 95 mass % and more preferably 5 to 90 mass % with respect to the total solid content of the undercoat layer.

An organic pigment used for the undercoat layer is not particularly limited, but plastic hollow particles are preferable. Plastic hollow particles can improve the recording sensitivity. Furthermore, plastic hollow particles can stay on the support to form a uniform under coating layer, which improves the barrier property, and thus can prevent the color former from coming into contact with a plasticizer or an alkali filler contained in neutralized paper to suppress deterioration of the color forming ability.

The plastic hollow particles are not particularly limited, and examples thereof include hollow non-foamable plastic hollow particles comprising a shell made of a thermoplastic resin and an internal gas to be hollow in advance, and particles comprising a low-boiling-point solvent inside as a foaming agent, so that they foam to form a hollow when heated. The plastic hollow particles are not particularly limited, and examples thereof include hollow particles in which the membrane material includes an acrylic resin, a styrene-based resin, a vinylidene chloride-based resin, or the like. The plastic hollow particles usually has a hollow rate of 50 to 99%. Here, the hollow rate is a value determined by $(d/D)\times100$ in which d represents the average inner diameter of the plastic hollow particles, and D represents the average outer diameter of the plastic hollow particles. The plastic hollow particles preferably have an average particle diameter of 0.5 to 10 μm, more preferably 1 to 4 μm, and still more preferably 1 to 3 μm. If the average particle diameter is 10 μm or less, the coating liquid for the undercoat layer applied with a blade coating method does not cause a trouble such a streak or a scratch, and good coating suitability can be obtained. Here, the average inner diameter (d) and the average outer diameter (D) of the plastic hollow particles described in the present description are calculated from the values of the inner diameter (the diameter of the hollow portion of a hollow particle) and the outer diameter, respectively, using an electron micrograph obtained by photographing the plastic hollow particles with a scanning electron microscope, and the inner diameter and the outer diameter are each determined by selecting the longest diameter of each particle. The average particle diameter refers to a median particle diameter (D50) value) measured with a laser diffraction/scattering particle diameter distribution measuring apparatus.

The content of the plastic hollow particles is not particularly limited and can be selected from a wide range, but is generally preferably 2 to 90 mass % with respect to the total solid content of the undercoat layer.

The lower limit is more preferably 5 mass % or more, and still more preferably 10 mass % or more from the viewpoint of enhancing an effect of improving the color-forming property and enhancing the barrier property. Meanwhile, the upper limit is more preferably 80 mass % or less, still more preferably 70 mass % or less, particularly preferably 60 mass % or less, and most preferably 50 mass % or less from the viewpoint of suppressing adhesion of scum to a thermal head.

In the case of using the oil-absorptive inorganic pigment and the plastic hollow particles in combination, the contents of the oil-absorptive inorganic pigment and the plastic are within the above ranges, respectively, and the total amount of the oil-absorptive inorganic pigment and the plastic hollow particles is preferably 5 to 90 mass %, more preferably 10 to 90 mass %, and still more preferably 10 to 80 mass % with respect to the total solid content of the undercoat laver.

The undercoat layer can be generally formed by mixing and dispersing the plastic hollow particles, a pigment such as an oil-absorptive pigment, a binder, an auxiliary agent, and the like using water as a medium to prepare a coating liquid for the undercoat layer, and applying and drying the prepared coating liquid on a support. The amount of the applied coating liquid for the undercoat layer is not particularly limited, but is preferably an amount such that the mass per unit area of the undercoat layer after drying is 3 to 20 $g/m^2$, and more preferably 5 to 12 $g/m^2$.

The binder contained in the undercoat layer can be appropriately selected from the water-soluble polymers and the hydrophobic polymers mentioned as the binder contained in the heat-sensitive recording composition. Oxidized starch, starch-vinyl acetate graft copolymers, polyvinyl alcohol, styrene-butadiene copolymers, and the like are particularly preferable from the viewpoint of improving the coating film strength. The content of the binder is not particularly limited and can be selected from a wide range, but is generally preferably 5 to 30 mass % and more preferably 10 to 20 mass % with respect to the total solid content of the undercoat layer.

In the heat-sensitive recording material, a back surface layer containing a pigment and a binder as main components can be provided on a support surface opposite from the heat-sensitive recording layer, as necessary. Thus, the storability of a printed portion and an unprinted portion (background) can be further enhanced, and the curling suitability and the printer traveling property can be enhanced. Furthermore, various known techniques in the field of manufacturing a heat-sensitive recording body can be added, as necessary, such as processing into an adhesive label by adhesive treatment of the back surface, or providing a magnetic recording layer, a coating layer for printing, a thermal transfer recording layer, or an inkjet recording layer.

The method of applying the dispersion or the coating liquid for formation of each layer on the support is not particularly limited, and examples of the method include bar coating, air knife coating, Vari-Bar blade coating, pure blade coating, rod blade coating, short dwell coating, curtain coating, and die coating. Each dispersion or coating liquid may be applied and dried to form one layer, or the same dispersion or coating liquid may be divided, and applied and dried to form two or more layers including the same composition. Two or more layers may be formed by simultaneous multilayer coating in which two or more kinds of dispersions or coating liquids are simultaneously applied.

The method of applying the coating liquid for the undercoat layer is preferably a blade coating method from the viewpoint of improving a surface property of the undercoat layer. Thus, a heat-sensitive recording layer having a uniform thickness can be formed without unevenness of the support to enhance the recording sensitivity. In terms of quality, since the surface smoothness of the undercoat layer is further improved, curtain coating with the coating liquid for the heat-sensitive recording layer can be performed with enhanced coating uniformity to improve the barrier property of the overcoat layer provided as necessary. The blade coating methods are not limited to coating methods in which a blade typified by a bevel blade or a vent blade is used, and also include pure blade coating, a rod blade method, a bill blade method, and the like.

The heat-sensitive recording layer and the overcoat layer are preferably formed by simultaneous multilayer coating by curtain coating or the like. Thus, a uniform coating layer can be formed to improve the barrier property of the overcoat layer, and in addition, the productivity can be enhanced. The curtain coating is a method in which a coating liquid is freely dropped down and applied to a support in a non-contact manner, and a known method such as a slide curtain method, a couple curtain method, or a twin curtain method can be employed without particular limitation. As described in JP-A-2006-247611 (Patent Literature 5), a coating liquid layer can be transferred onto a web surface by ejecting the coating liquid downward from a curtain head to form a coating liquid layer on an inclined surface, and forming a curtain of the coating liquid from a downward curtain guide portion at an end portion of the inclined surface. In the simultaneous multilayer coating, layers may be formed by layering and then applying coating liquids and then drying the coating liquids, or layers may be formed by applying a coating liquid for formation of a lower layer, then applying a coating liquid for formation of an upper layer on a lower layer coating surface while the lower layer coating surface is wet without drying, and then drying the coating liquids.

From the viewpoint of enhancing the recording sensitivity and improving the image uniformity, smoothing may be performed using a known method with a super calender, a soft calender, or the like after formation of each layer or in an any process after formation of all layers.

The method of recording information on the heat-sensitive recording material of the present invention is to be appropriately selected according to the purpose, and examples of the method include methods in which a thermal head printer, a $CO_2$ laser, a semiconductor laser, or the like is used.

EXAMPLES

Hereinafter, the present invention will be described more specifically with reference to Examples, but the present invention is not limited by Examples below at all. In Examples, the term “part” means part by mass, and the term “%” means mass %.

The median particle diameter of a dispersion in Examples was measured with a laser diffraction/scattering particle diameter distribution measuring apparatus Microtrac MT3300EX II (manufactured by MicrotracBEL Corp.).

1. Preparation of Dispersion of Heat-Sensitive Recording Composition and Production of Heat-Sensitive Recording Material

Example 1

(Step 1) Preparation of Dispersion [A] of Color Developer

A mixture having the following composition was ground and dispersed with a bead mill (LABSTAR Mini LMZ015) manufactured by Ashizawa Finetech Ltd. to prepare a dispersion [A] of N-[2-(3-phenylureido)phenyl]benzenesulfonamide having a median particle diameter of 0.7 μm.

| Liquid [A] | |
|---|---|
| N-[2-(3-phenylureido)phenyl]benzenesulfonamide | 30.0 parts |
| Sulfonic acid-modified polyvinyl alcohol (KURARAY POVAL 3-86SD, Kuraray Co., Ltd.) 20% aqueous solution | 15.0 parts |
| Water | 55.0 parts |

N-[2-(3-phenylureido)phenyl]benzenesulfonamide was synthesized with reference to the description of Patent Literature 3.

(Step 2) Preparation of Dispersion [B] of 1,3-Diphenylurea

A mixture with the following composition was ground and dispersed with a bead mill (LABSTAR Mini LMZ015) manufactured by Ashizawa Finetech Ltd. to prepare a dispersion [B] containing 1,3-diphenylurea with a median particle diameter of 1.0 μm.

| Liquid [B] | |
|---|---|
| 1,3-Diphenylurea (Tokyo Chemical Industry Co., Ltd.) | 30.0 parts |
| Sulfonic acid-modified polyvinyl alcohol (KURARAY POVAL 3-86SD, Kuraray Co., Ltd.) 20% aqueous solution | 15.0 parts |
| Water | 55.0 parts |

(Step 3) Preparation of Dispersion [C] of Color Former

A mixture with the following composition was ground and dispersed with a bead mill (LABSTAR Mini LMZ015)

manufactured by Ashizawa Finetech Ltd. to prepare a dispersion [C] containing a color former with a median particle diameter of 1.0 μm.

| Liquid [C] | |
|---|---|
| 3-Dibutylamino-6-methyl-7-anilinofluoran (BLACK 400, Fukui Yamada Chemical Co., Ltd.) | 30.0 parts |
| Sulfonic acid-modified polyvinyl alcohol (KURARAY POVAL 3-86SD, Kuraray Co., Ltd.) 20% aqueous solution | 15.0 parts |
| Water | 55.0 parts |

(Step 4) Preparation of Dispersion of Heat-sensitive Recording Composition

The dispersions [A] to [C] obtained above, a calcium carbonate aqueous dispersion, a polyvinyl alcohol aqueous solution, and a zinc stearate aqueous dispersion were mixed at the following composition to prepare a dispersion of a heat-sensitive recording composition.

| | |
|---|---|
| Liquid [A] | 16.7 parts |
| Liquid [B] | 5.6 parts |
| Liquid [C] | 7.1 parts |
| 67% Calcium carbonate aqueous dispersion | 7.2 parts |
| 12% Polyvinyl alcohol aqueous solution | 19.2 parts |
| 37% Zinc stearate aqueous dispersion | 2.3 parts |
| Water | 41.9 parts |

(Step 5) Production of Heat-Sensitive Recording Material

On wood free high quality paper having a basis weight of 50 $g/m^2$, the dispersion of the heat-sensitive recording composition obtained in Step 4 was applied and dried in such an amount that the mass per unit area of the color former became 0.5 $g/m^2$ as dried, and the material was subjected to a calendering process to produce a heat-sensitive recording material. In this example, the mass ratio of color developer/1,3-diphenylurea is 3/1.

Example 2

A dispersion of a heat-sensitive recording composition was prepared, and a heat-sensitive recording material was produced in the same manner as in Example 1 except that in Step 4, the content of the liquid [B] was changed to 11.1 parts, the content of the 67% calcium carbonate aqueous dispersion was changed to 8.4 parts, and the content of the 12% polyvinyl alcohol aqueous solution was changed to 22.5 parts. In this example, the mass ratio of color developer/1,3-diphenylurea is 3/2.

Example 3

A dispersion of a heat-sensitive recording composition was prepared, and a heat-sensitive recording material was produced in the same manner as in Example 1 except that in Step 4, the amount of the liquid [B] was changed to 16.7 parts, the amount of the 67% calcium carbonate aqueous dispersion was changed to 9.7 parts, and the amount of the 12% polyvinyl alcohol aqueous solution was changed to 25.8 parts. In this example, the mass ratio of color developer/1,3-diphenylurea is 3/2.

Example 4

A dispersion of a heat-sensitive recording composition was prepared, and a beat-sensitive recording material was produced in the same manner as in Example 1 except that in Step 4, the content of the liquid [B] was changed to 22.3 parts, the content of the 67% calcium carbonate aqueous dispersion was changed to 10.9 parts, and the content of the 12% polyvinyl alcohol aqueous solution was changed to 29.2 parts. In this example, the mass ratio of color developer/1,3-diphenylurea is 3/4.

Examples 5 to 8

Dispersions of heat-sensitive recording compositions of Examples 5 to 8 were prepared, and heat-sensitive recording materials were produced in the same manner as in Examples 1 to 4, except that N-[2-(3-phenylureido)phenyl]benzenesulfonamide in Step 1 in Examples 1 to 4 was respectively changed to N-(p-toluenesulfonyl)-N'-(3-p-toluenesulfonyloxyphenyl) urea. In these examples, the mass ratio of color developer/1,3-diphenylurea is 3/1, 3/2, 3/3, and 3/4, respectively.

N-(p-toluenesulfonyl)-N'-(3-p-toluenesulfonyloxyphenyl) urea was synthesized with reference to the description of Patent Literature 4.

Comparative Example 1

A dispersion of a heat-sensitive recording composition was prepared and a heat-sensitive recording material was produced in the same manner as in Example 1 except that in Step 4, the liquid [B] was not added, the content of the 67% calcium carbonate aqueous dispersion was changed to 5.9 parts, and the content of the 12% polyvinyl alcohol aqueous solution was changed to 15.8 parts. In this example, the mass ratio of color developer/1,3-diphenylurea is 3/0.

Comparative Example 2

A dispersion of a heat-sensitive recording composition was prepared, and a heat-sensitive recording material was produced in the same manner as in Comparative Example 1 except that N-[2-(3-phenylureido)phenyl]benzenesulfonamide in Step 1 was changed to N-(p-toluenesulfonyl)-N'-(3-p-toluenesulfonyloxyphenyl) urea. Also in this example, the mass ratio of color developer/1,3-diphenylurea is 3/0.

Comparative Example 3

A comparative dispersion of a heat-sensitive recording composition was prepared, and a heat-sensitive recording material was produced in the same manner as in Example 1 except that in Step 4, the liquid [A] was not added, the content of the liquid [B] was changed to 16.7 parts, the content of the 67% calcium carbonate aqueous dispersion was changed to 5.9 parts, and the content of the 12% polyvinyl alcohol aqueous solution was changed to 15.8 parts. In this example, the mass ratio of color developer/1,3-diphenylurea is 0/3.

2. Evaluation of Thermal Responsiveness and Resistance of Printed Portion and Background for Each Heat-Sensitive Recording Material

[Print Color Formation by Dynamic Color Formation Sensitivity Testing Machine]

Each of the heat-sensitive recording materials produced in Examples 1 to 8 and Comparative Examples 1 to 3 was printed at an applied energy of 0.39 mJ/dot using a thermal printer (TH-M2/PP) manufactured by Okura Engineering Co., LTD., and the optical density (OD value) of the printed portion was measured using a reflection densitometer (trade name: FD-7, manufactured by KONICA MINOLTA, INC.) under the following conditions. A larger numerical value of the printing density means a higher printing density and more excellent thermal responsiveness. Tables 1 and 2 show the results.

Measurement Conditions

Measurement method: reflection measurement

Illumination condition: C

Observation field: 2° White reference density: absolute value

[Various Resistance Tests of Printed Portion and Background]

Each of the heat-sensitive recording materials obtained in Examples 1 to 8 and Comparative Examples 1 to 3 was printed at an applied energy of 0.39 mJ/dot using a thermal printer (TH-M2/PP) manufactured by Okura Engineering Co., LTD., and the optical density (OD value) of the printed portion and the brightness of the background were measured using a reflection densitometer (trade name: FD-7, manufactured by KONICA MINOLTA, INC.) before and after the following treatments. The measurement conditions of the optical density and the brightness are the same as the measurement conditions in "Print Color Formation by Dynamic Color Formation Sensitivity Testing Machine" described above.

(1) Treatment Conditions for Moist Heat Resistance Test

Each printed heat-sensitive recording material was held for 144 hours under each of a condition of 40° C.' and 90% R.H. and a condition of 50° C. and 80% R.H. using a thermo-hygrostat (trade name: Enviros KCL-2000A) manufactured by TOKYO RIKAKIKAI CO., LTD.

(2) Treatment Conditions for Water Resistance Test

Each printed heat-sensitive recording material was immersed in water at 25° C. for 24 hours.

(3) Treatment Conditions for Hot Water Resistance Test

Each printed sample was immersed in hot water at 40° C. for 24 hours.

(4) Treatment Conditions for Oil Resistance Test

On the printed portion of each printed heat-sensitive recording material, 2 drops of cottonseed oil were dropped, and the heat-sensitive recording material was left to stand at 25° C. for 2 hours.

(5) Treatment Conditions for Hand Cream Resistance Test

Onto the printed portion of each printed heat-sensitive recording material, a hand cream (containing a mineral oil and glycerin) was applied, and the heat-sensitive recording material was left to stand at 25° C. for 4 hours.

(6) Treatment Conditions for Heat Resistance Test

Each printed heat-sensitive recording material was held at 60° C., 70° C., or 80° C. for 144 hours, or at 90° C. for 24 hours using an air-blowing thermostat (trade name: DKM600) manufactured by Yamato Scientific Co., Ltd.

(7) Treatment Conditions for Alcohol Resistance Test

On each printed heat-sensitive recording material. 2 drops of a 70% ethanol aqueous solution were dropped, and wiped off after 30 seconds.

(8) Treatment Conditions for Plasticizer Resistance Test

A vinyl chloride wrap film (containing a plasticizer) was wound in a single layer on each printed heat-sensitive recording material, and held at 25° C. for 24 hours.

For the printed portion, the residual rate of the printed portion after the treatment in each test was calculated with the following formula.

Residual rate (%)=(Optical density of printed portion after treatment)/(Optical density of printed portion before treatment)×100

Tables 1 and 2 summarize the test results. Note that, in general a printed portion after treatment is required to exhibit an optical density (OD value) of 0.60 or more for visual discrimination, and the background portion is required to have a whiteness of 70 or more after treatment.

TABLE 1

| | Thermosensitive recording layer | | | Evaluation result | | | | | | | | | | | | | | | |
|---|---|---|---|---|---|---|---|---|---|---|---|---|---|---|---|---|---|---|---|
| | | | Mass ratio of color-developing agent/stabilizer | Before resistance test | | Moist heat resistance (40° C., 90% R.H.) | | | Moist heat resistance (50° C., 80% R.H.) | | | Water resistance | | Hot water resistance | | Oil resistance | | Hand cream resistance | |
| | Color-developing agent | Stabilizer | in terms of solid content | Back-ground | Printing density | Back-ground | Printed portion | Residual rate of printed portion | Back-ground | Printed portion | Residual rate of printed portion | Printed portion | Residual rate of printed portion | Printed portion | Residual rate of printed portion | Printed portion | Residual rate of printed portion | Printed portion | Residual rate of printed portion |
| Comparative Example 1 | N-[2-(3-phenylureido)phenyl]benzene-sulfonamide | None | 3/0 | 84.0 | 1.22 | 82.7 | 1.20 | 98% | 82.0 | 1.16 | 95% | 0.96 | 79% | 0.42 | 34% | 0.59 | 48% | 0.20 | 16% |
| Example 1 | | 1,3-Diphenylurea | 3/1 | 84.2 | 1.29 | 82.9 | 1.26 | 98% | 82.5 | 1.20 | 93% | 1.14 | 88% | 0.64 | 50% | 0.84 | 65% | 0.44 | 34% |
| Example 2 | | | 3/2 | 84.6 | 1.30 | 83.1 | 1.20 | 92% | 82.6 | 1.17 | 90% | 1.13 | 87% | 0.66 | 51% | 0.90 | 69% | 0.50 | 38% |
| Example 3 | | | 3/3 | 84.8 | 1.32 | 83.3 | 1.19 | 90% | 82.7 | 1.15 | 87% | 1.13 | 85% | 0.61 | 46% | 0.88 | 66% | 0.49 | 37% |
| Example 4 | | | 3/4 | 84.8 | 1.31 | 83.5 | 1.09 | 83% | 83.0 | 1.04 | 79% | 1.09 | 83% | 0.55 | 42% | 0.80 | 61% | 0.42 | 32% |
| Comparative Example 2 | N-(p-toluenesulfonyl)-N'-(3-p-toluenesulfonyl-oxyphenyl)urea | None | 3/0 | 83.5 | 1.22 | 75.3 | 1.16 | 95% | 70.2 | 1.08 | 88% | 0.96 | 79% | 0.57 | 47% | 1.22 | 100% | 0.61 | 50% |
| Example 5 | | 1,3-Diphenylurea | 3/1 | 83.7 | 1.28 | 75.6 | 1.21 | 95% | 70.8 | 1.14 | 89% | 1.11 | 86% | 0.77 | 60% | 1.28 | 100% | 0.81 | 63% |
| Example 6 | | | 3/2 | 84.5 | 1.29 | 75.8 | 1.21 | 94% | 71.2 | 1.15 | 89% | 1.14 | 88% | 0.78 | 60% | 1.29 | 100% | 0.83 | 64% |
| Example 7 | | | 3/3 | 84.6 | 1.29 | 75.9 | 1.18 | 91% | 71.6 | 1.10 | 85% | 1.10 | 85% | 0.75 | 58% | 1.29 | 100% | 0.79 | 61% |
| Example 8 | | | 3/4 | 84.7 | 1.28 | 76.2 | 1.04 | 81% | 71.9 | 0.98 | 77% | 1.06 | 83% | 0.70 | 55% | 1.25 | 98% | 0.73 | 57% |
| Comparative Example 3 | None | 1,3-Diphenylurea | 0/3 | 85.0 | 0.97 | 84.3 | 0.38 | 39% | 84.1 | 0.29 | 30% | 0.75 | 77% | 0.29 | 30% | 0.23 | 24% | 0.14 | 15% |

TABLE 2

| | Thermosensitive recording layer | | | Evaluation result | | | | | | | | | | | | | | | |
|---|---|---|---|---|---|---|---|---|---|---|---|---|---|---|---|---|---|---|---|
| | | | Mass ratio of color- | Heat resistance (60° C.) | | | Heat resistance (70° C.) | | | Heat resistance (80° C.) | | | Heat resistance (90° C.) | | | Alcohol resistance | | Plasticizer resistance | |
| | Color-developing agent | Stabilizer | developing agent/stabilizer in terms of solid content | Back-ground | Printed portion | Residual rate of printed portion | Back-ground | Printed portion | Residual rate of printed portion | Back-ground | Printed portion | Residual rate of printed portion | Back-ground | Printed portion | Residual rate of printed portion | Printed portion | Residual rate of printed portion | Printed portion | Residual rate of printed portion |
| Comparative Example 1 | N-[2-(3-phenylureido) phenyl] benzene-sulfonamide | None | 3/0 | 81.4 | 1.19 | 98% | 76.0 | 1.18 | 97% | 75.4 | 1.15 | 95% | 72.1 | 1.12 | 92% | 0.59 | 48% | 0.46 | 37% |
| Example 1 | | 1,3-Diphenylurea | 3/1 | 81.7 | 1.29 | 100% | 77.0 | 1.25 | 97% | 76.7 | 1.24 | 96% | 73.4 | 1.20 | 93% | 0.74 | 57% | 0.93 | 72% |
| Example 2 | | | 3/2 | 82.2 | 1.28 | 98% | 77.4 | 1.25 | 96% | 77.1 | 1.28 | 98% | 73.7 | 1.25 | 96% | 0.75 | 58% | 0.94 | 72% |
| Example 3 | | | 3/3 | 82.8 | 1.27 | 96% | 77.5 | 1.27 | 96% | 77.3 | 1.30 | 98% | 73.9 | 1.25 | 95% | 0.78 | 59% | 0.96 | 73% |
| Example 4 | | | 3/4 | 83.0 | 1.23 | 94% | 77.5 | 1.18 | 90% | 77.4 | 1.16 | 89% | 74.2 | 1.14 | 87% | 0.72 | 55% | 0.85 | 65% |
| Comparative Example 2 | N-(p-toluenesulfonyl)-N'-(3-p-toluenesulfonyl-oxyphenyl) urea | None | 3/0 | 79.2 | 1.18 | 97% | 69.6 | 1.20 | 99% | 68.0 | 1.17 | 96% | 58.1 | 1.15 | 94% | 0.98 | 80% | 0.99 | 81% |
| Example 5 | | 1,3-Diphenylurea | 3/1 | 80.5 | 1.25 | 98% | 71.3 | 1.28 | 100% | 70.1 | 1.25 | 98% | 60.0 | 1.22 | 95% | 1.08 | 84% | 1.09 | 85% |
| Example 6 | | | 3/2 | 81.2 | 1.29 | 100% | 71.7 | 1.29 | 100% | 70.2 | 1.29 | 100% | 60.2 | 1.27 | 98% | 0.10 | 85% | 1.10 | 85% |
| Example 7 | | | 3/3 | 81.2 | 1.24 | 96% | 71.8 | 1.29 | 100% | 70.4 | 1.29 | 100% | 60.3 | 1.25 | 97% | 1.08 | 84% | 1.09 | 84% |
| Example 8 | | | 3/4 | 81.3 | 1.20 | 94% | 71.9 | 1.23 | 96% | 70.5 | 1.17 | 91% | 60.4 | 1.15 | 90% | 1.05 | 82% | 1.05 | 82% |
| Comparative Example 3 | None | 1,3-Diphenylurea | 0/3 | 83.4 | 0.45 | 46% | 77.0 | 0.45 | 46% | 79.4 | 0.34 | 35% | 76.0 | 0.31 | 32% | 0.22 | 23% | 0.13 | 14% |

From the results of Tables 1 and 2, it is found that all of the heat-sensitive recording materials of Examples 1 to 8 were excellent in thermal responsiveness, and water resistance, hot water resistance, oil resistance, hand cream resistance, alcohol resistance, and plasticizer resistance of a printed portion and heat resistance of a background, and had improved thermal responsiveness and improved stability of a printed portion and a background, as compared with conventional heat-sensitive recording materials containing a non-phenolic compound as a color developer.

INDUSTRIAL APPLICABILITY

The present invention provides a heat-sensitive recording material which exhibits excellent thermal responsiveness and stability of a printed portion and a background.

The invention claimed is:

1. A heat-sensitive recording material comprising:

a support; and a heat-sensitive recording layer on the support, wherein the heat-sensitive recording layer is made of a heat-sensitive recording composition comprising a color former, a color developer, and a stabilizer, wherein the composition comprises N-[2-(3-phenylureido)phenyl] benzenesulfonamide or N-(p-toluenesulfonyl)-N'-(3-p-toluenesulfonyloxyphenyl)urea as the color developer, and 1,3-diphenylurea as the stabilizer, 3-dibutylamino-6-methyl-7-anilinofluoran as the color former, and wherein a mass ratio of a content of the color developer to a content of the 1,3-diphenylurea is 3:2 to 3:1.

2. The heat-sensitive recording material according to claim 1 wherein a mass ratio of a content of the color developer to a content of the color former is 1:1 to 5:1.

3. The heat-sensitive recording material according to claim 1, wherein the support is wood-free paper, synthetic paper, or a plastic film.

4. The heat-sensitive recording material according to claim 1, wherein the material comprises the heat-sensitive recording layer at a mass per unit area of 1 to 20 $g/m^2$.

5. The heat-sensitive recording material according to claim 1, wherein the material further comprises an undercoat layer comprising an organic pigment and/or an inorganic pigment between the support and the heat-sensitive recording layer.

6. The heat-sensitive recording material according to claim 5, wherein the inorganic pigment is an oil-absorbing inorganic pigment with the oil absorption of 70 to 150 ml/100 g.

7. The heat-sensitive recording material according to claim 6, wherein the inorganic pigment is calcined kaolin.

8. The heat-sensitive recording material according to claim 5, wherein the organic pigment is plastic hollow particles with a value of 50 to 99 as calculated by the formula: (average inner diameter/average outer diameter)×100.

9. The heat-sensitive recording material according to claim 3, wherein the material comprises the heat-sensitive recording layer at a mass per unit area of 1 to 20 $g/m^2$.

* * * * *